US010859765B2

(12) United States Patent
Park et al.

(10) Patent No.: US 10,859,765 B2
(45) Date of Patent: Dec. 8, 2020

(54) OPTICAL COUPLING DEVICE AND METHOD FOR MANUFACTURING THE SAME

(71) Applicant: ELECTRONICS AND TELECOMMUNICATIONS RESEARCH INSTITUTE, Daejeon (KR)

(72) Inventors: Jaegyu Park, Daejeon (KR); Gyungock Kim, Daejeon (KR); Jiho Joo, Sejong (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 31 days.

(21) Appl. No.: 16/183,499

(22) Filed: Nov. 7, 2018

(65) Prior Publication Data
US 2019/0146153 A1    May 16, 2019

(30) Foreign Application Priority Data
Nov. 10, 2017  (KR) .................. 10-2017-0149175

(51) Int. Cl.
| G02B 6/26  | (2006.01) |
| G02B 6/42  | (2006.01) |
| G02B 6/10  | (2006.01) |
| G02B 6/122 | (2006.01) |
| G02B 6/30  | (2006.01) |
| G02B 6/12  | (2006.01) |
| G02B 6/13  | (2006.01) |
| G02B 6/125 | (2006.01) |

(52) U.S. Cl.
CPC ....... G02B 6/1228 (2013.01); G02B 6/12002 (2013.01); G02B 6/125 (2013.01); G02B 6/13 (2013.01); G02B 6/305 (2013.01); G02B 2006/12147 (2013.01)

(58) Field of Classification Search
CPC ...... G02B 6/1228; G02B 6/125; G02B 6/305; G02B 6/12002; G02B 6/13; G02B 2006/12147
USPC ...... 385/14, 28, 30, 31, 43, 49, 50, 129–132
See application file for complete search history.

(56) References Cited

U.S. PATENT DOCUMENTS

| 4,389,567 A * | 6/1983 | Khoe ................. G02B 6/125 250/214 LA |
| 8,267,583 B2 | 9/2012 | Yao et al. |

(Continued)

OTHER PUBLICATIONS

Kuanping Shang et al., "Low-loss compact multilayer silicon nitride platform for 3D photonic integrated circuits", Optics Express, Aug. 6, 2015, vol. 23, No. 16, Optical Society of America.

*Primary Examiner* — Kaveh C Kianni
*Assistant Examiner* — Hung Q Lam

(57) ABSTRACT

Provided are an optical coupling device and a method for manufacturing the same. The optical coupling device includes a first waveguide including a first forward tapered part, a second waveguide disposed on the first waveguide and including a first reverse tapered part in a direction opposite to the first forward tapered part, and an interlayer waveguide disposed between the first and second waveguides and having a thickness corresponding to a distance between the first forward tapered part and the first reverse tapered part.

14 Claims, 11 Drawing Sheets

(56) References Cited

U.S. PATENT DOCUMENTS

| | | | |
|---|---|---|---|
| 8,995,804 B2* | 3/2015 | Achouche | G02B 6/12002 |
| | | | 385/30 |
| 9,316,792 B2 | 4/2016 | Park et al. | |
| 9,401,346 B2 | 7/2016 | Kwok et al. | |
| 9,746,607 B2* | 8/2017 | Collins | G02B 6/12002 |
| 2007/0171515 A1* | 7/2007 | Kang | H01S 5/026 |
| | | | 359/333 |
| 2012/0156369 A1 | 6/2012 | Kim et al. | |
| 2012/0230635 A1* | 9/2012 | Yoshida | G02B 6/125 |
| | | | 385/43 |

\* cited by examiner

OPTICAL COUPLING DEVICE AND METHOD FOR MANUFACTURING THE SAME

CROSS-REFERENCE TO RELATED APPLICATIONS

This U.S. non-provisional patent application claims priority under 35 U.S.C. § 119 of Korean Patent Application No. 10-2017-0149175, filed on Nov. 10, 2017, the entire contents of which are hereby incorporated by reference.

BACKGROUND

The present disclosure herein relates to an optical device and a method for manufacturing the same, and more particularly, to an optical coupling device and a method for manufacturing the same.

In recent years, a demand for high integration of a semiconductor integrated circuit has been explosively increased due to a sharp increase in transmission data capacity. In order to meet these requirements, a density of a two-dimensional semiconductor chip gradually increases. However, a degree of integration of the semiconductor circuit has not been continuously increased due to various factors. As an alternative, three-dimensional semiconductor chips have been actively studied. Likewise, in the fields of optical communication, studies of a three-dimensional photonic integrated circuit (PIC) are progressing gradually.

SUMMARY

The present disclosure provides an optical coupling device which is capable of being connected at the shortest distance and a method for manufacturing the same.

The present disclosure discloses an optical coupling device. An embodiment of the inventive concept provides an optical coupling device including: a first waveguide including a first forward tapered part; a second waveguide disposed on the first waveguide, the second waveguide including a first reverse tapered part in a direction opposite to the first forward tapered part; and an interlayer waveguide disposed between the first and second waveguides, the interlayer waveguide having a thickness corresponding to a distance between the first forward tapered part and the first reverse tapered part.

In an embodiment, the interlayer waveguide may include: a second forward tapered part disposed below the second waveguide and disposed in the same direction as the first forward tapered part; and a second reverse tapered part disposed on the first waveguide and disposed in the same direction as the first reverse tapered part.

In an embodiment, the interlayer waveguide may further include an interlayer connection part connected between the second forward tapered part and the second reverse tapered part.

In an embodiment, the interlayer connection part may be disposed between the first forward tapered part and the first reverse tapered part.

In an embodiment, the interlayer connection part may have a width greater than that of each of the first and second waveguides.

In an embodiment, the interlayer waveguide may have a ship shape.

In an embodiment, the optical coupling device may further include a clad surrounding the first waveguide, the interlayer waveguide, and the second waveguide, wherein the interlayer waveguide may have a refractive index less than that of each of the first and second waveguides and greater than that of the clad.

In an embodiment, the clad may include silicon oxide, and each of the first and second waveguides may include silicon nitride.

In an embodiment, the interlayer waveguide may include silicon oxynitride.

In an embodiment, the first reverse tapered part may be aligned with the first forward tapered part.

In an embodiment of the inventive concept, a method for manufacturing an optical coupling device includes: forming a lower clad on a substrate; forming a first waveguide including a first forward tapered part on the lower clad; forming an interlayer clad having a trench through which the first forward tapered part is locally exposed on the first waveguide and the lower clad; forming an interlayer waveguide within the trench; and forming a second waveguide on a portion of the interlayer waveguide and a portion of the interlayer clad.

In an embodiment, the forming of the interlayer waveguide may include performing a chemical vapor deposition process and a chemical mechanical polishing process of silicon oxynitride.

In an embodiment, the method may include forming an upper clad layer on the second waveguide and the interlayer waveguide.

In another embodiment of the inventive concept, an optical coupling device includes: a first waveguide having a first direction; a second waveguide disposed on the first waveguide and having the first direction; and an interlayer waveguide disposed between the first and second waveguides and having a thickness a thickness corresponding to a distance between the first and second waveguides. Here, the interlayer waveguide may include a forward tapered part disposed in the first direction below the second waveguide outside the first waveguide; and a reverse tapered part disposed in a direction opposite to the first direction on the first waveguide outside the second waveguide.

In an embodiment, the interlayer waveguide may further include an interlayer connection part connected between the forward tapered part and the reverse tapered part and having a width greater than that of each of the first and second waveguides.

In an embodiment, the second waveguide may include an upper tapered part disposed in a direction opposite to the first direction on the interlayer connection part.

In an embodiment, the first waveguide may include a lower tapered part disposed in the first direction below the interlayer connection part.

In an embodiment, the upper tapered part may be aligned on the lower tapered part.

In an embodiment, each of the forward tapered part, the reverse tapered part, and the interlayer connection part may include: first to third low-refractive index layers; and first and second high-refractive index layers alternately disposed with the first to third low-refractive index layers and each of which has a refractive index greater than that of each of the first to third low-refractive index layers.

In an embodiment, the refractive index of each of the first and second high-refractive index layers may be the same as that of each of the first and second waveguides.

In an embodiment, the first high-refractive index layer may be thinner than the second high-refractive index layer.

In an embodiment, each of the first to third low-refractive index layers may include silicon oxynitride, and each of the first and second high-refractive index layers may include silicon nitride.

In an embodiment, the interlayer waveguide may have a ship shape.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
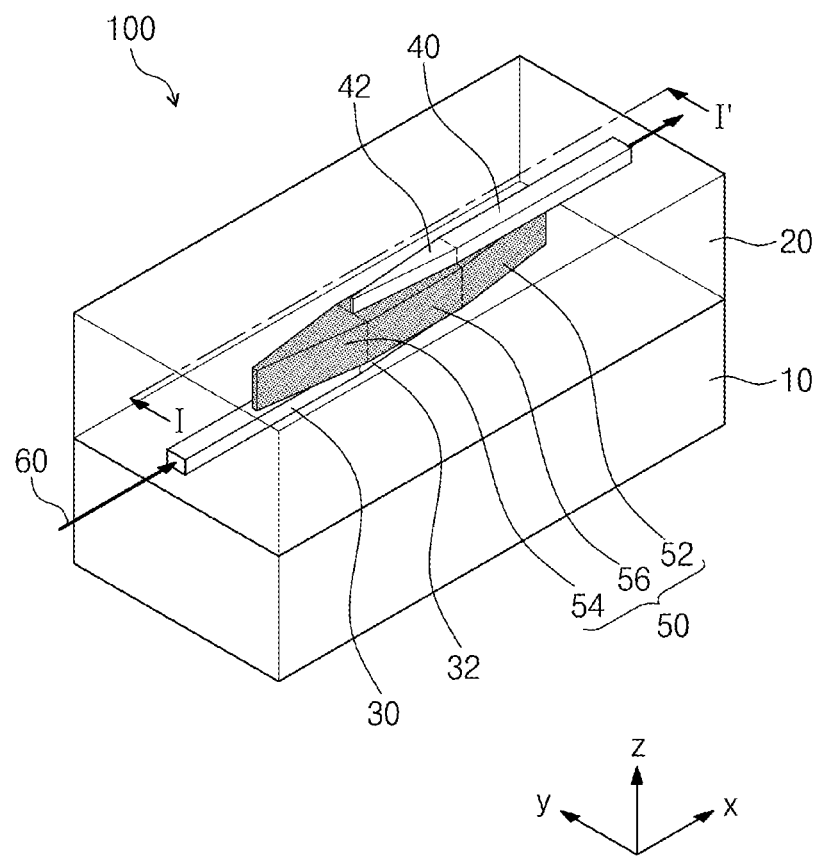
FIG. 1 is a perspective view of an optical coupling device according to an embodiment of the inventive concept.

Preferred embodiments of the present invention will be described below in detail with reference to the accompanying drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

In the following description, the technical terms are used only for explaining a specific exemplary embodiment while not limiting the inventive concept. In this specification, the terms of a singular form may comprise plural forms unless specifically mentioned. The meaning of 'comprises' and/or 'comprising' specifies a component, a step, an operation and/or an element does not exclude other components, steps, operations and/or elements. Since preferred embodiments are provided below, the order of the reference numerals given in the description is not limited thereto. In addition, it will be understood that when an element such as a layer, film, region, or substrate is referred to as being on another element, it can be directly on the other element or intervening elements may also be present.

Additionally, the embodiment in the detailed description will be described with sectional views as ideal exemplary views of the present invention. In the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. For example, a curved layer may be formed as a flat layer. Areas exemplified in the drawings have general properties and are used to illustrate a specific shape of a device. Thus, this should not be construed as limited to the scope of the inventive concept.

Figure 2:
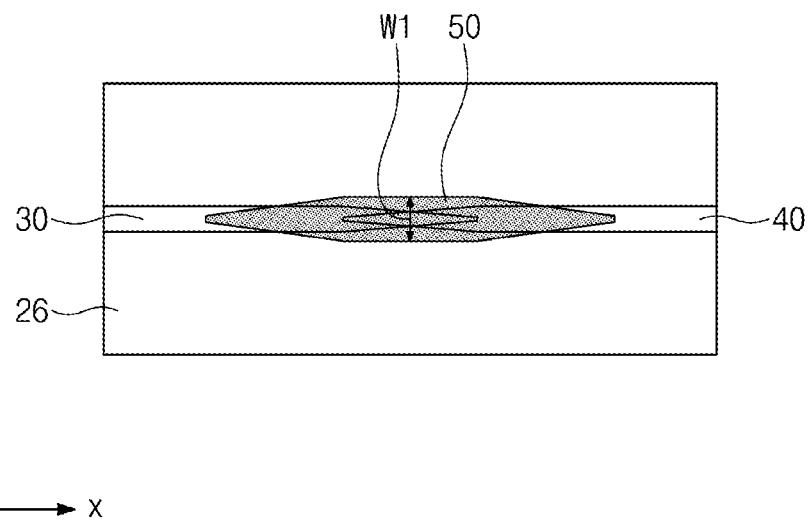
FIG. 2 is a plan view of the optical coupling device of FIG. 1.

FIG. 1 is a perspective view of an optical coupling device 100 according to an embodiment of the inventive concept. FIG. 2 is a plan view of the optical coupling device 100 of FIG. 1, and FIG. 3 is a cross-sectional view taken along line I-I' of FIG. 1.

Figure 3:
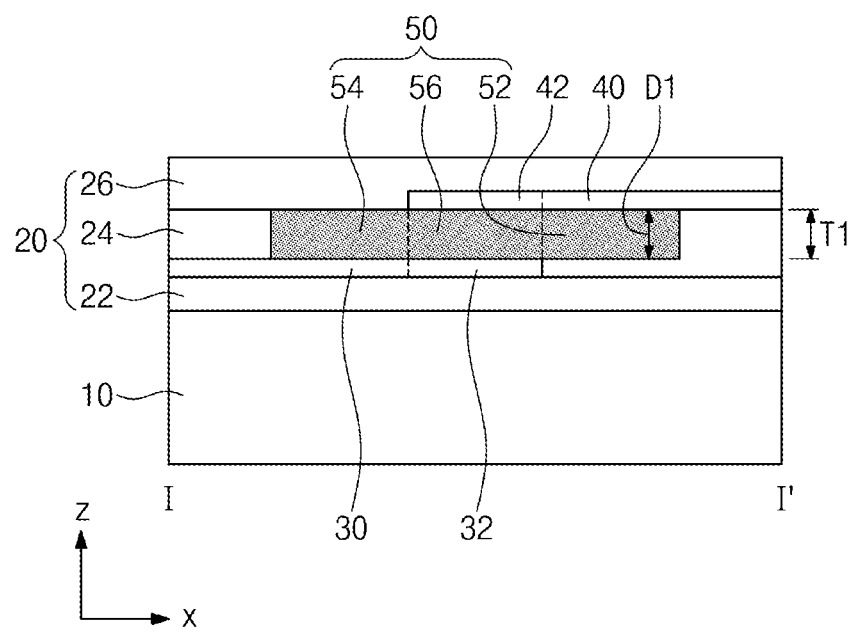
FIG. 3 is a cross-sectional view taken along line I-I' of FIG. 1.

Referring to FIGS. 1 to 3, the optical coupling device 100 according to the inventive concept may be a three-dimensional optical coupler. According to an embodiment, the optical coupling device 100 may include a substrate 10, a clad 20, a first waveguide 30, a second waveguide 40, and an interlayer waveguide 50.

The substrate 10 may include a silicon wafer. Alternatively, the substrate 10 may be a printed circuit board.

The clad 20 may be disposed on the substrate 10. For example, the clad 20 may include silicon oxide ($SiO_2$). The first waveguide 30, the second waveguide 40, and the interlayer waveguide 50 may be disposed within the clad 20. According to an embodiment, the clad 20 may include a lower clad 22, an interlayer clad 24, and an upper clad 26. The lower clad 22 may be disposed between the substrate 10 and the first waveguide 30. The interlayer clad 24 may be disposed on the lower clad 22 and the first waveguide 30. The upper clad 26 may be disposed on the interlayer clad 24, the second waveguide 40, and the interlayer waveguide 50.

The first waveguide 30 may be disposed on the lower clad 22. The first waveguide 30 may be disposed in a first direction x. The first waveguide 30 may have a refractive index greater than that of the clad 20. The first waveguide 30 may include silicon nitride ($SiN_x$). According to an embodiment, the first waveguide 30 may include a first forward tapered part 32. The first forward tapered part 32 may be tapered in a direction of the second waveguide 40 in view of a plane. When the first forward tapered part 32 is disposed in the first direction x, a width of the first forward tapered part 32 in a second direction y may gradually decrease. Here, the forward direction may be defined as a propagating direction of light 60. The light 60 may be successively provided to the first waveguide 30, the interlayer waveguide 50, and the second waveguide 40. That is, the forward direction may be the first direction x.

The second waveguide 40 may be disposed on the first waveguide 30. The second waveguide 40 may be disposed in the first direction x. The second waveguide 40 may include silicon nitride. According to an embodiment, the second waveguide 40 may include a first reverse tapered part 42. The first reverse tapered part 42 may be aligned and/or overlap the first forward tapered part 32. For example, the first reverse tapered part 42 may have the same length as the first forward tapered part 32. When the first reverse tapered part 42 is disposed in a direction opposite to the first direction x, a width of the first reverse tapered part 42 in the second direction y may gradually decrease. Here, the reverse direction may be defined as a direction opposite to the propagating direction of the light 60. That is, the reverse direction may be a direction opposite to the first direction x.

The interlayer waveguide 50 may be disposed between the first waveguide 30 and the second waveguide 40. The interlayer waveguide 50 may have a refractive index less than that of each of the first waveguide 30 and the second waveguide 40 and greater than that of the clad 20. For example, the interlayer waveguide 50 may include silicon oxynitride (SiON). The interlayer waveguide 50 may have a ship shape. The interlayer waveguide 50 may connect the first waveguide 30 to the second waveguide 40 in a direction perpendicular to the substrate 10. Thus, the first waveguide 30 may be connected to the second waveguide 40 at the shortest distance by the interlayer waveguide 50. According to an embodiment, the interlayer waveguide 50 may have a thickness T1 corresponding to a distance D1 between the first forward tapered part 32 and the first reverse tapered part 42. That is, the thickness T1 of the interlayer waveguide 50 may be the same as the distance D1 between the first forward tapered part 32 and the first reverse tapered part 42. Thus, the interlayer waveguide 50 may connect the first forward tapered part 32 and the first reverse tapered part 42 to each other at the shortest distance.

Although not shown, a third waveguide (not shown) or the optical device disposed in a direction crossing the first waveguide 30 is disposed below the second waveguide 40, the interlayer waveguide 50 may prevent crosstalk interference and/or noise between the second waveguide 40 and the third waveguide from occurring. The first waveguide 30 may be disposed at the same height as the third waveguide. In general, when the optical devices or the optical waveguides are spaced a distance of about 1 µm or more, the crosstalk interference and/or the noise therebetween may be removed. Thus, the interlayer waveguide 50 may increase a vertical distance between the third waveguide and the second waveguide 40, which have the same level as the first waveguide 30, by a height of about 1 µm or more to remove the crosstalk interference and/or the noise between the third waveguide and the second waveguide 40.

Referring to FIGS. 1 and 3, the interlayer waveguide 50 may include a second forward tapered part 52, a second reverse tapered part 54, and an interlayer connection part 56.

The second forward tapered part 52 and the second reverse tapered part 54 may be bidirectional tapered parts connected to both sidewalls of the interlayer connection part 56. The second forward tapered part 52 may be disposed below the second waveguide 40. The second forward tapered part 52 may overlap a portion of the first forward tapered part 32 in view of the plane. On the other hand, the second forward tapered part 52 may be separated from the first forward tapered part 32 in a forward direction.

The second reverse tapered part 54 may be disposed on the first waveguide 30. The second reverse tapered part 54 may be mainly disposed on the first waveguide 30 and may overlap a portion of the first reverse tapered part 42 in view of the plane. The light 60 may be transmitted from the first waveguide 30 to the second reverse tapered part 54. On the other hand, the second reverse tapered part 54 may be separated from the first forward tapered part 42 in a reverse direction.

The interlayer connection part 56 may be disposed between the second forward tapered part 52 and the second reverse tapered part 54 in the first direction x. The interlayer connection part 56 may be disposed between the first forward tapered part 32 and the first reverse tapered part 42 in a third direction z. For example, the interlayer connection part 56 may have the same length as the first forward tapered part 32 or the first reverse tapered part 42. Also, the interlayer connection part 56 may have a width greater than that of each of the first waveguide 30 and the second waveguide 40. When the light 60 is provided from the first forward tapered part 32 to the interlayer connection part 56, a mode (not shown) of the light 60 may be expanded in the interlayer connection part 56. Also, when the light 60 is provided from the interlayer connection part 56 to the first forward tapered part 42, the mode of the light 60 may be reduced within the first reverse tapered part 42. Thus, the mode of the light 60 may be coupled from the first waveguide 30 to the second waveguide 40 through the interlayer waveguide 50.

A method for manufacturing the above-described optical coupling device 100 will be described below.

Figure 4:
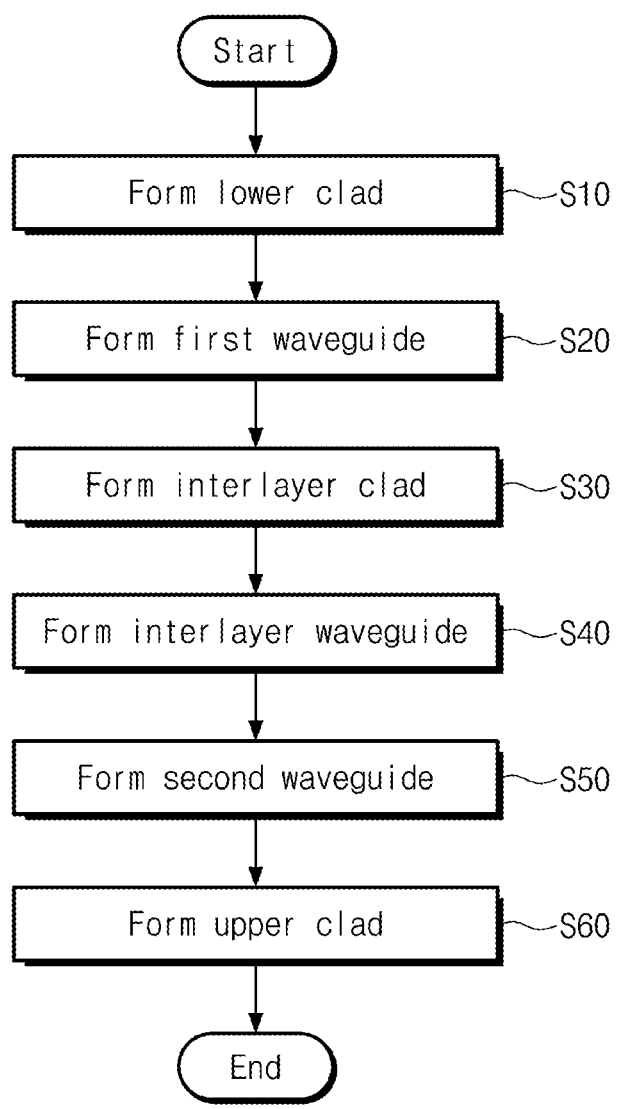
FIG. 4 is a flowchart illustrating a method for manufacturing the optical coupling device of FIG. 1.

FIG. 4 illustrates a method for manufacturing the optical coupling device 100 of FIG. 1.

Referring to FIG. 4, the method for manufacturing the optical coupling device 100 may include a process (S10) of forming a lower clad 22, a process (S20) of forming a first waveguide 30, a process (S30) of forming an interlayer clad 24, a process (S40) of forming an interlayer waveguide 50, a process (50) of forming a second waveguide 40, and a process (S60) of forming an upper clad 26.

FIGS. 5 to 10 are process cross-sectional views illustrating the method for manufacturing the optical coupling device 100 of FIG. 1.

Figure 5:
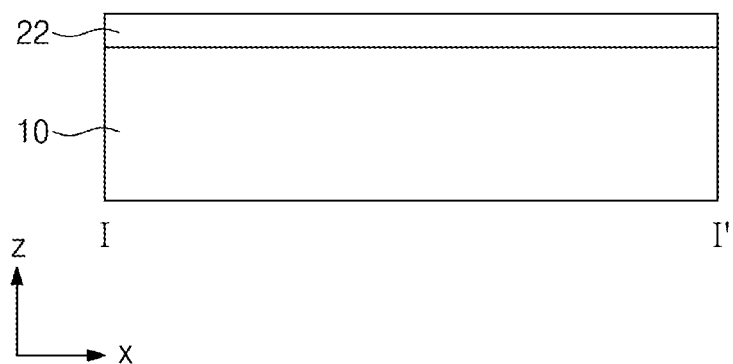
FIGS. 5 to 10 are process cross-sectional views illustrating the method for manufacturing the optical coupling device of FIG. 1.

Referring to FIGS. 4 and 5, the lower clad 22 is formed on the substrate 10 (S10). The lower clad 22 may include silicon oxide formed through a chemical vapor deposition process or a rapid thermal process (RTP) process.

Figure 6:
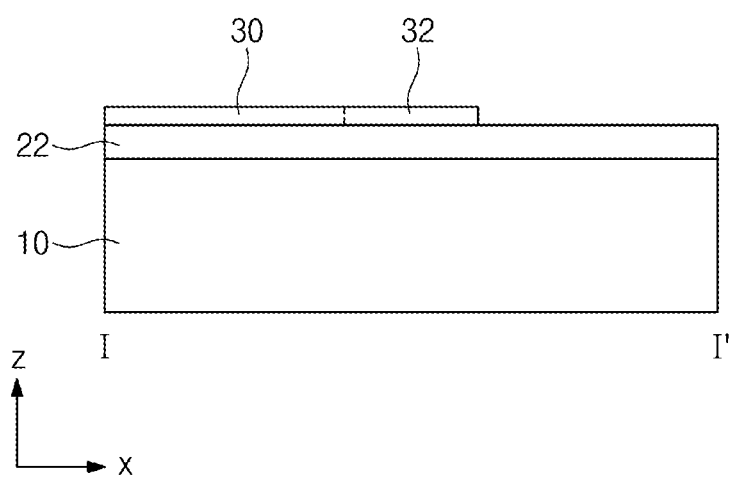

Referring to FIGS. 4 and 6, the first waveguide 30 is formed on the lower clad 22 (S20). The first waveguide 30 may be formed by performing a chemical vapor deposition process, a photolithography process, and an etching process of a silicon nitride layer (not shown). First, the silicon nitride layer may be deposited on the lower clad 22 through the chemical vapor deposition process. When a photoresist pattern (not shown) is formed on a portion of the silicon nitride layer, the silicon nitride layer may be etched along the photoresist pattern to form the first waveguide 30. Thereafter, the photoresist pattern may be removed by an organic solvent. The first waveguide 30 may include the first forward tapered part 32.

Figure 7:
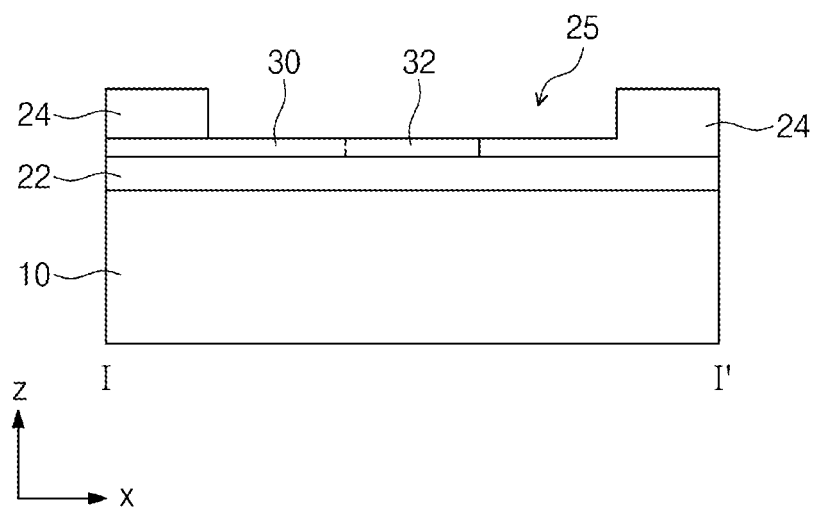

Referring to FIGS. 4 and 7, the interlayer clad 24 is formed on the lower clad 22 and the first waveguide 30 (S30). The interlayer clad 24 may include silicon oxide formed through the chemical vapor deposition process. The interlayer clad 24 may have a trench 25 through which a portion of the first waveguide 30, a portion of the lower clad 22, and the first forward tapered part 32 are exposed. The trench 25 may be formed through a photolithography process and an etch process.

Figure 8:
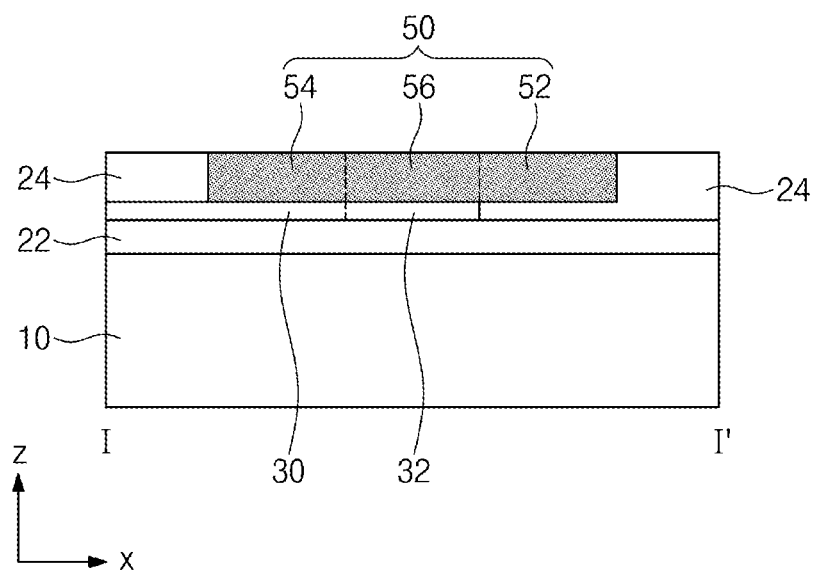

Referring to FIGS. 4 and 8, the interlayer waveguide 50 is formed within the trench 25 of the interlayer clad 24 (S40). The interlayer waveguide 50 may be formed by performing a chemical vapor deposition process and performing a planarization process of a silicon oxynitride (SiON) layer. The silicon oxynitride layer may be deposited on the first forward tapered part 32 and the interlayer clad 24 within the trench 25. The trench 25 may be filled with the silicon oxynitride layer. The silicon oxynitride layer may be planarized by performing a chemical mechanical polishing process until the interlayer clad 24 is exposed. The interlayer waveguide 50 may be formed within the trench 25.

Figure 9:
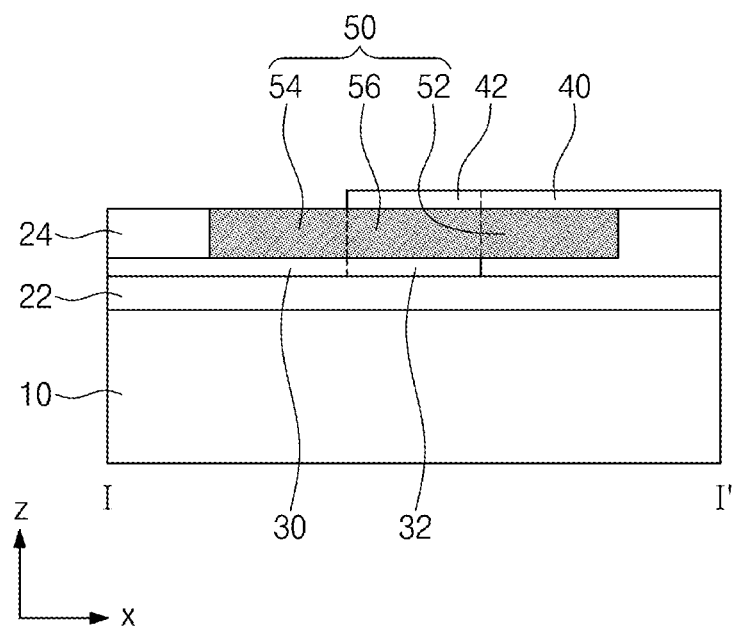

Referring to FIGS. 4 and 9, a second waveguide 40 is formed on a portion of the interlayer clad 24 and a portion of the interlayer waveguide 50. The second waveguide 40 may be formed by performing a chemical vapor deposition process, a photolithography process, and an etching process of a silicon nitride layer.

Figure 10:
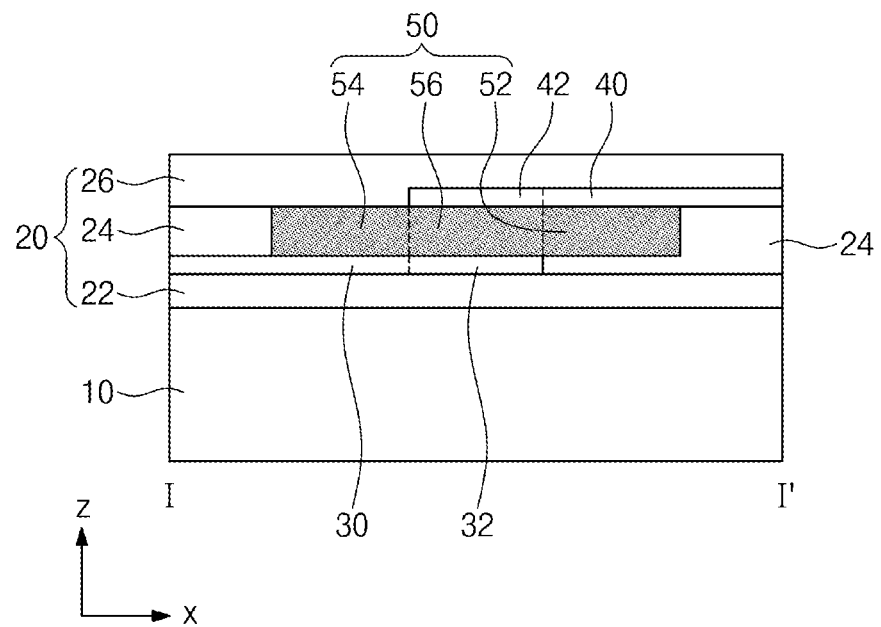

Referring to FIGS. 4 and 10, the upper clad 26 is formed on the interlayer clad 24 and the second waveguide 40 (S60). The upper clad 26 may include silicon oxide formed through the chemical vapor deposition process.

Figure 11:
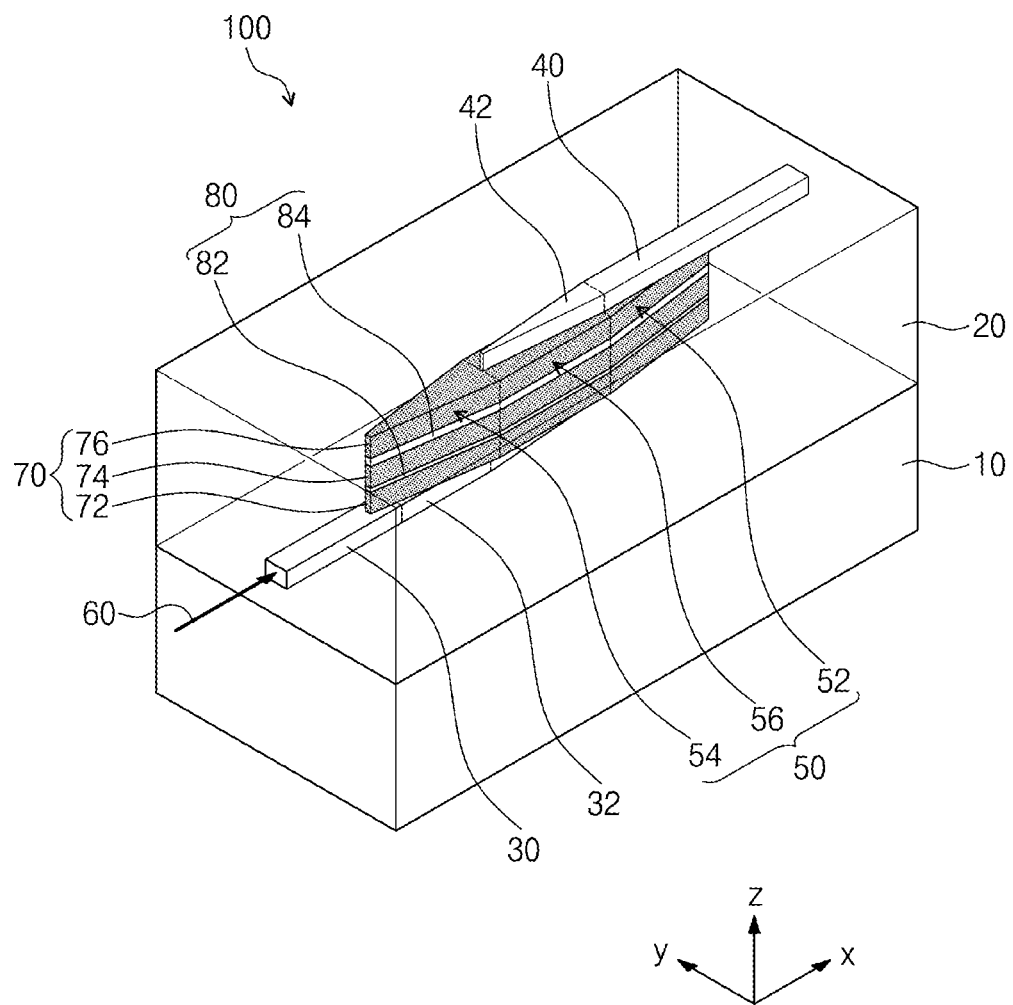
FIG. 11 is a perspective view of an optical coupling device according to an embodiment of the inventive concept.

FIG. 11 illustrates an example of the optical coupling device 100 according to the inventive concept.

Referring to FIG. 11, each of the second forward tapered part 52, the second reverse tapered part 54, and the interlayer connection part 56 of the interlayer waveguide 50 may include low-refractive index layers 70 and high-refractive index layers 80. Each of the low-refractive index layers 70 may have a refractive index less than that of each of the high-refractive index layers 80. For example, when the low-refractive index layers 70 include silicon oxynitride, the high-refractive index layers 80 may be silicon nitride. The high-refractive index layers 80 may be disposed between the low-refractive index layers 70. When the low-refractive index layers 70 include first to third low-refractive index layers 72, 74, and 76, the high-refractive index layers 80 may include first and second high-refractive index layers 82 and 84. The first to third low-refractive index layers 72, 74, and 76 may be stacked between first and second waveguides 30, 40. The second high-refractive index layer 84 may be disposed on the first high-refractive index layer 82. The second high-refractive index layer 84 may have a thickness greater than that of the first high-refractive index layer 82. That is, the second high-refractive index layer 84 may have an effective refractive index greater than that of the first high-refractive index layer 82. The light 60 may be propagated in a direction in which the effective refractive index increases. The light 60 may be sequentially provided to the first and second high-refractive index layers 82 and 84. On the other hand, the light 60 may not be transmitted from the second high-refractive index layer 84 to the first high-refractive index layer 82.

A substrate 10 and a clad 20 of the optical coupling device 100 may the same as those of the optical coupling device 100 of FIG. 1.

Figure 12:
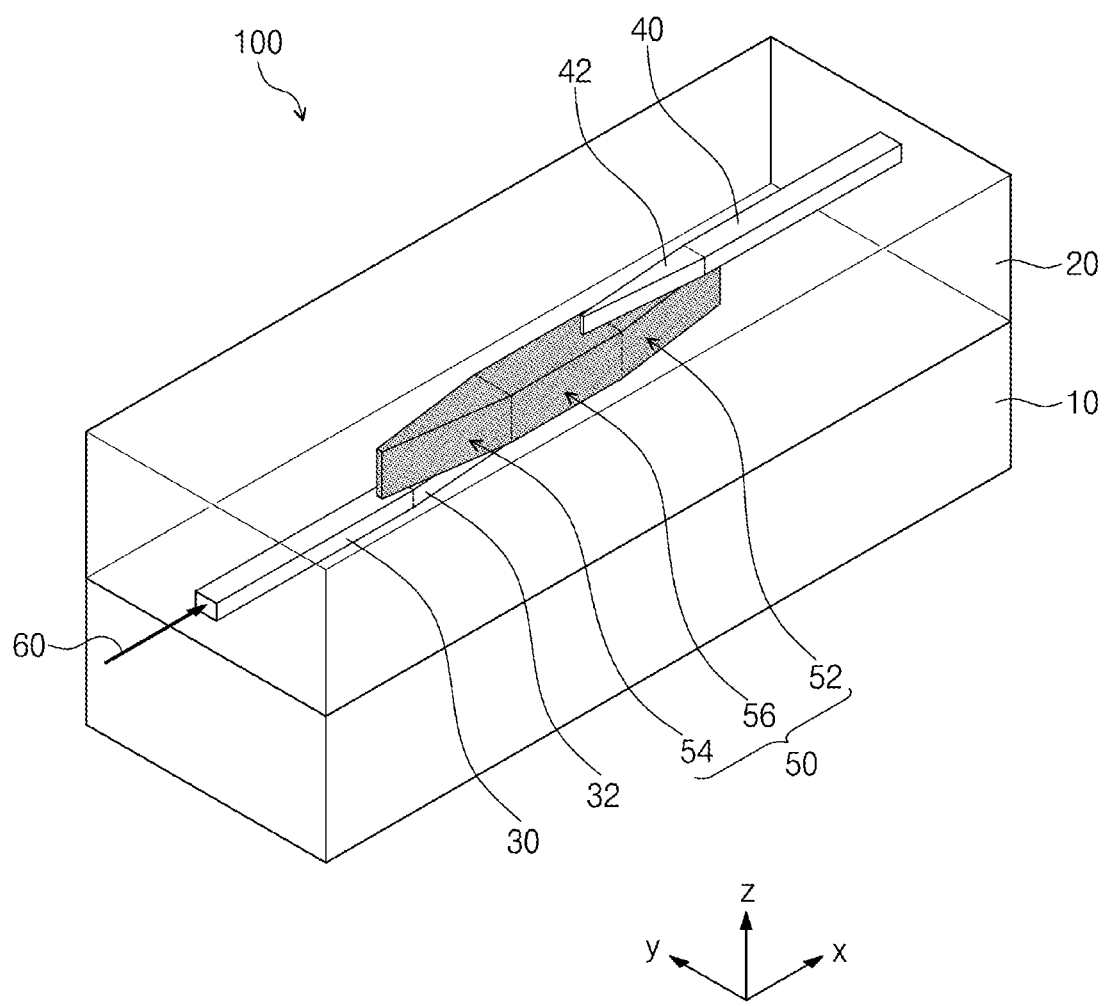
FIG. 12 is a perspective view of an optical coupling device according to an embodiment of the inventive concept.

FIG. 12 illustrates an example of the optical coupling device 100 according to the inventive concept.

Referring to FIG. 12, a first forward tapered part 32 of a first waveguide 30 may overlap a second reverse tapered part 54 of an interlayer waveguide 50, and a first reverse tapered part 42 of a second waveguide 40 may overlap a second forward tapered part 52 of a first reverse tapered part 42. Light 60 may be transmitted from the first waveguide 30 up to the second waveguide 40. On the other hand, the light 60 may be transmitted from the second waveguide 40 up to the first waveguide 30.

A substrate 10 and a clad 20 of the optical coupling device 100 may be the same as those of the optical coupling device 100 of FIG. 1.

Figure 13:
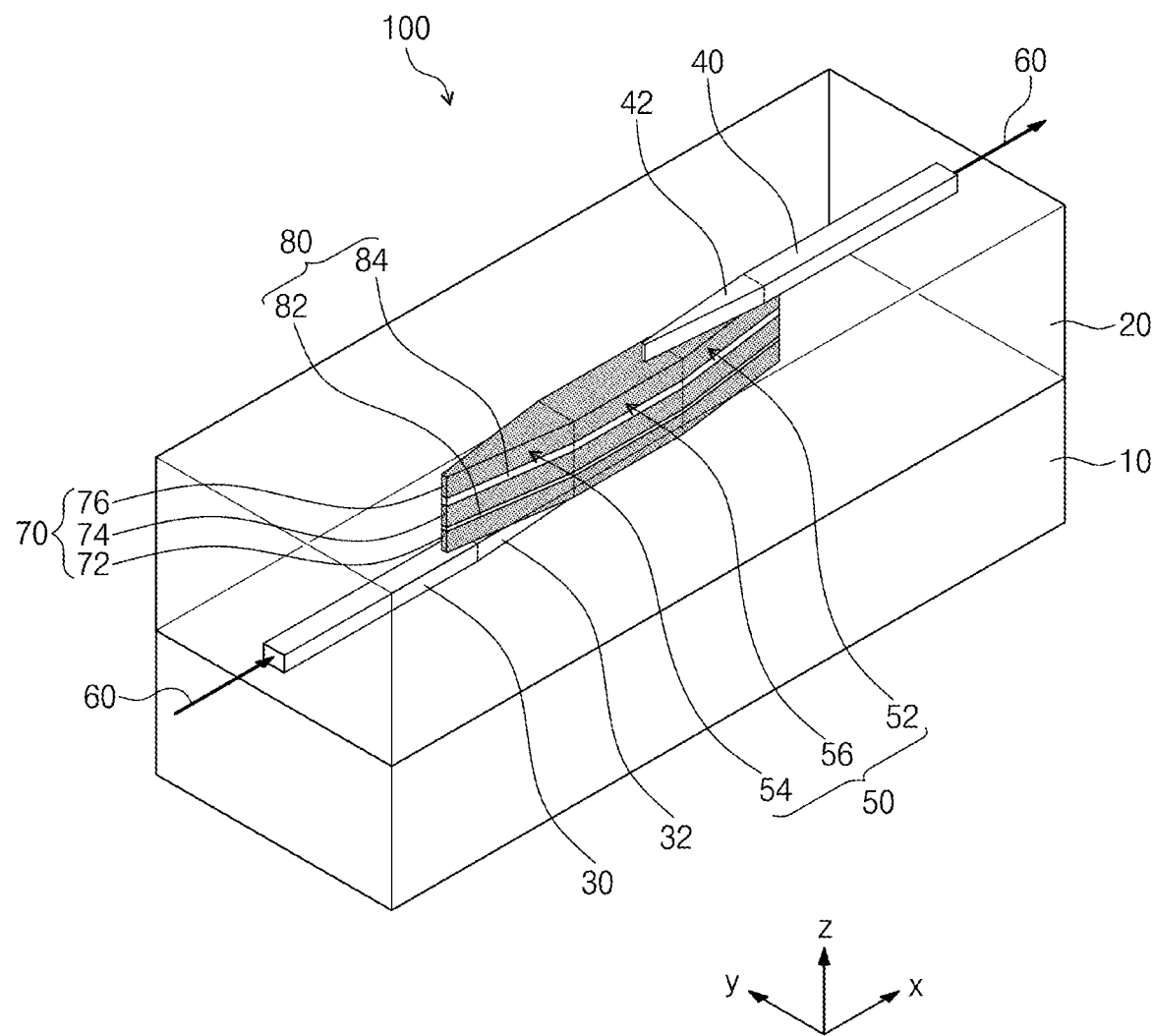
FIG. 13 is a perspective view of an optical coupling device according to an embodiment of the inventive concept.

FIG. 13 illustrates an example of the optical coupling device 100 according to the inventive concept.

Referring to FIG. 13, each of a second forward tapered part 52, a second reverse tapered part 54, and an interlayer connection part 56 of an interlayer waveguide 50 may include low-refractive index layers 70 and high-refractive index layers 80. The low-refractive index layers 70 include first to third low-refractive index layers 72, 74, and 76, and the high-refractive index layers 80 may include first and second high-refractive index layers 82 and 84, which are alternately disposed within the first to third low-refractive index layers 72, 74, and 76. The second high-refractive index layer 84 may have a thickness greater than that of the first high-refractive index layer 82.

A first forward tapered part 32 of a first waveguide 30 may overlap the second reverse tapered part 54. A first reverse tapered part 42 of a second waveguide 40 may overlap the second forward tapered part 52. Light 60 may be transmitted from the first waveguide 30 up to the second waveguide 40.

A substrate 10 and a clad 20 of the optical coupling device 100 may be the same as those of the optical coupling device 100 of FIG. 1.

Figure 14:
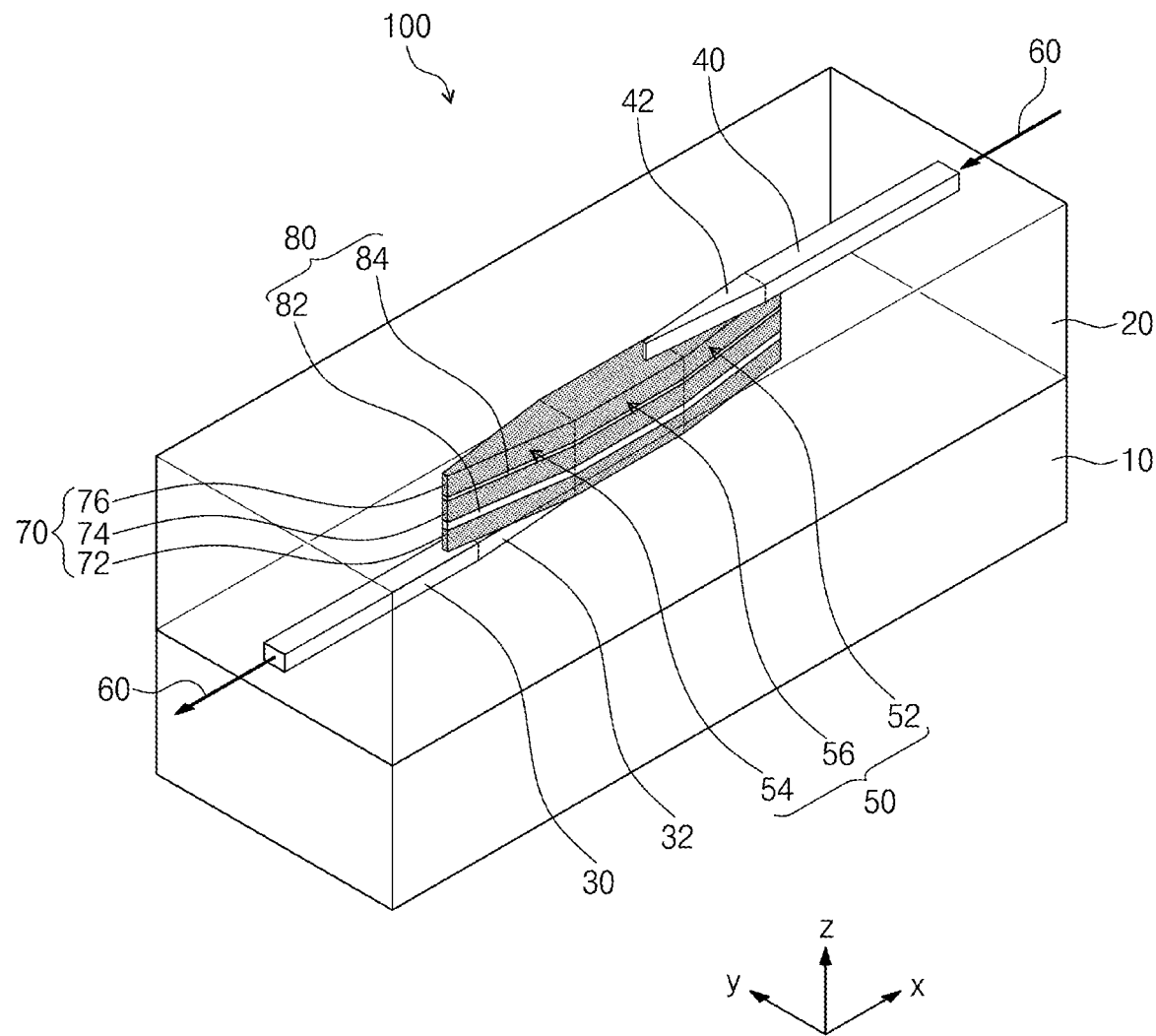
FIG. 14 is a perspective view of an optical coupling device according to an embodiment of the inventive concept.

FIG. 14 illustrates an example of the optical coupling device 100 according to the inventive concept.

Referring to FIG. 14, a first high-refractive index layer 82 of an interlayer waveguide 50 may have a thickness greater than that of a second high-refractive index layer 84. Light 60 may be propagated from a second waveguide 40 up to a first waveguide 30.

Low-refractive index layers 70 of the interlayer waveguide 50 may have the same as that of the interlayer waveguide 50 of FIG. 11, and a substrate 10, a clad 20, a first waveguide 30, and a second waveguide 40 of the optical coupling device 100 may the same as those of the optical coupling device 100 of FIG. 12.

Figure 15:
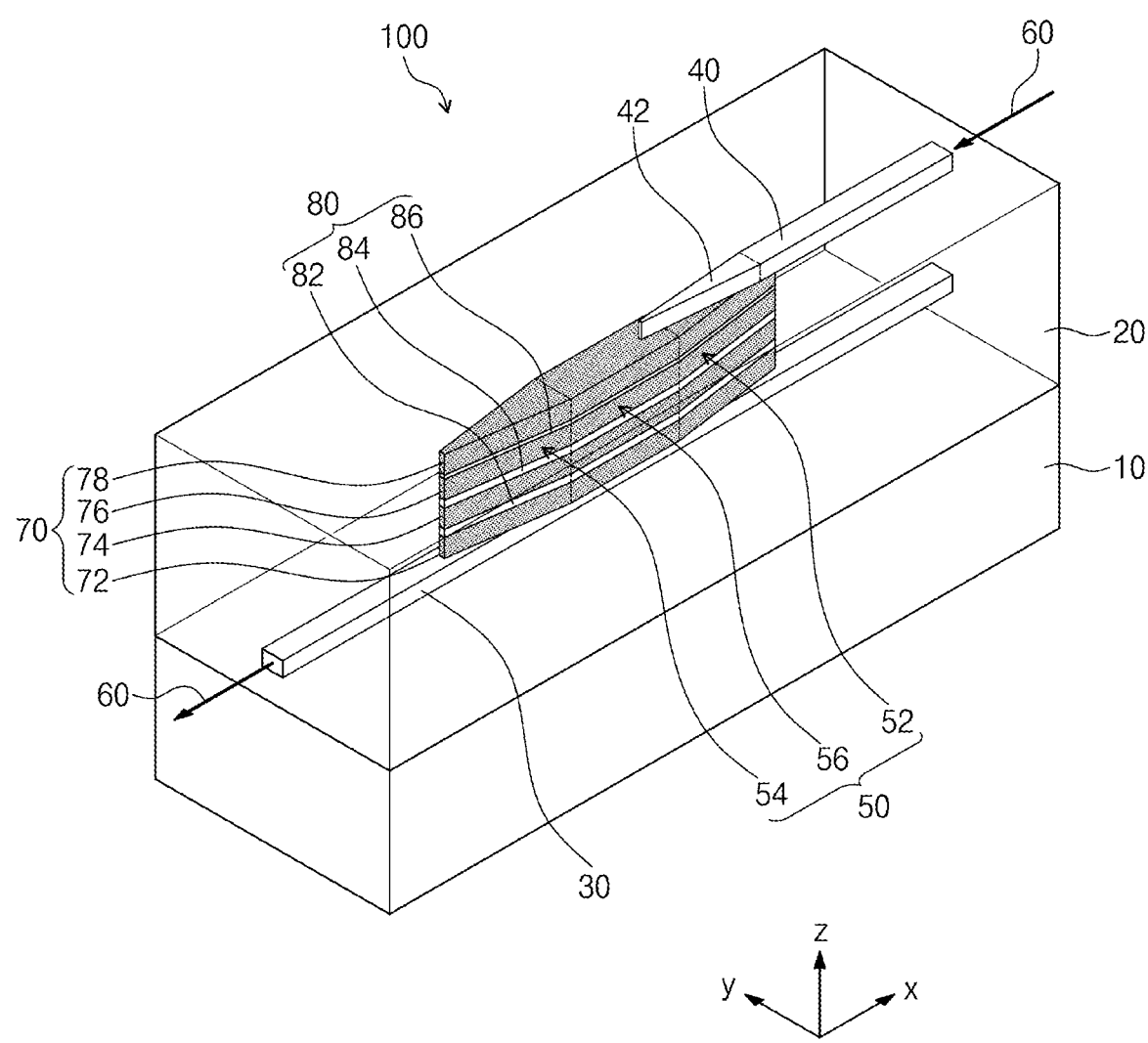
FIG. 15 is a perspective view of an optical coupling device according to an embodiment of the inventive concept.

FIG. 15 illustrates an example of the optical coupling device 100 according to the inventive concept.

Referring to FIG. 15, the optical coupling device 100 may be an isolator. According to an embodiment, a first waveguide 30 may extend in a first direction x without including a first forward tapered part 32.

Each of a second forward tapered part 52, a second reverse tapered part 54, and an interlayer connection part 56 of an interlayer waveguide 50 may include first to fourth low-refractive index layers 72, 74, 76, and 78 of low-refractive index layers 70 and first to third high-refractive index layers 82, 84, and 86 of high-refractive index layers 80. The first to third high-refractive index layers 82, 84, and 86 and the first to fourth low-refractive index layers 72, 74, 76, and 78 may be alternately laminated. Each of the first to third high-refractive index layers 82, 84, and 86 may have a thickness that is inversely proportional to a height thereof. Light 60 may be provided to an interlayer waveguide 50 and the first waveguide 30 through a second waveguide 40. On the other hand, when the light 60 is provided to the first waveguide 30, the interlayer waveguide 50 may not transmit the light 60 to the second waveguide 40.

A substrate 10 and a clad 20 of the optical coupling device 100 may be the same as those of the optical coupling device 100 of FIG. 1.

As described above, the optical coupling device according to the inventive concept may include the interlayer waveguide having a thickness corresponding to a distance between the first forward tapered part of the first waveguide and the first reverse tapered part of the second waveguide. The interlayer waveguide may connect the first forward tapered part and the first reverse tapered part to each other at the shortest distance.

Although the embodiment of the inventive concept is described with reference to the accompanying drawings, those with ordinary skill in the technical field of the inventive concept pertains will be understood that the present disclosure can be carried out in other specific forms without changing the technical idea or essential features. Thus, the above-disclosed embodiments are to be considered illustrative and not restrictive.

What is claimed is:

1. An optical coupling device comprising:
a first waveguide including a first forward tapered part;
a second waveguide disposed on the first waveguide, the second waveguide including a first reverse tapered part in a direction opposite to the first forward tapered part; and
an interlayer waveguide disposed between the first and second waveguides, the interlayer waveguide having a thickness corresponding to a distance between the first forward tapered part and the first reverse tapered part,
wherein the first forward tapered part is aligned with the first reverse tapered part and the first forward tapered part overlaps with the first reverse tapered part when seen in a plan view, and
wherein the interlayer waveguide comprises:
a second forward tapered part disposed below the second waveguide and disposed in the same direction as the first forward tapered part; and
a second reverse tapered part disposed on the first waveguide and disposed in the same direction as the first reverse tapered part.

2. The optical coupling device of claim 1, wherein the interlayer waveguide further comprises an interlayer connection part connected between the second forward tapered part and the second reverse tapered part.

3. The optical coupling device of claim 2, wherein the interlayer connection part is disposed between the first forward tapered part and the first reverse tapered part.

4. The optical coupling device of claim 2, wherein the interlayer connection part has a width greater than that of each of the first and second waveguides.

5. The optical coupling device of claim 1, wherein the interlayer waveguide has a ship shape.

6. The optical coupling device of claim 1, further comprising a clad surrounding the first waveguide, the interlayer waveguide, and the second waveguide, wherein the interlayer waveguide has a refractive index less than that of each of the first and second waveguides and greater than that of the clad.

7. The optical coupling device of claim 6, wherein the clad comprises silicon oxide, and each of the first and second waveguides comprises silicon nitride.

8. The optical coupling device of claim 1, wherein the interlayer waveguide comprises silicon oxynitride.

9. The optical coupling device of claim 1, wherein the first waveguide extends in a first direction and the first forward tapered part of the first waveguide has a first width in a second direction, the first width decreasing toward the first direction,
wherein the second waveguide extends in the first direction and the first reverse tapered part of the second waveguide has a second width in the second direction, the second width increasing toward the first direction, and
wherein the interlayer waveguide is disposed between the first and second waveguides in a third direction, the third direction being perpendicular to a plane defined by the first direction and the second direction.

10. The optical coupling device of claim 1, wherein the thickness of the interlayer waveguide is the same as the distance between the first forward tapered part of the first waveguide and the first reverse tapered part of the second waveguide.

11. An optical coupling device comprising:
a first waveguide including a first forward tapered part;
a second waveguide disposed on the first waveguide, the second waveguide including a first reverse tapered part in a direction opposite to the first forward tapered part; and
an interlayer waveguide disposed between the first and second waveguides, the interlayer waveguide having a thickness corresponding to a distance between the first forward tapered part and the first reverse tapered part,
wherein the first forward tapered part is aligned with the first reverse tapered part and the first forward tapered part overlaps with the first reverse tapered part when seen in a plan view, and
wherein the interlayer waveguide includes a first high-refractive index layer and a second high-refractive index layer, the second high-refractive index layer being disposed over the first high-refractive index layer.

12. The optical coupling device of claim 11, wherein the second high-refractive index layer has a thickness greater than that of the first high-refractive index layer.

13. The optical coupling device of claim 11, wherein the interlayer waveguide further includes a first low-refractive index layer, a second low-refractive index layer, and a third low-refractive index layer, each of the first, second, and third low-refractive index layers having a refractive index less than that of each of the first and second high-refractive index layers.

14. The optical coupling device of claim 13, wherein the first high-refractive index layer is disposed between the first low-refractive index layer and the second low-refractive index layer, and the second high-refractive index layer is disposed between the second low-refractive index layer and the third low-refractive index layer.

* * * * *